(12) United States Patent
Zhang et al.

(10) Patent No.: US 12,174,023 B2
(45) Date of Patent: Dec. 24, 2024

(54) METHOD AND SYSTEM TO VALIDATE ROAD SIGNS

(71) Applicant: HERE Global B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 947 days.

(21) Appl. No.: 16/697,890

(22) Filed: Nov. 27, 2019

(65) Prior Publication Data

US 2021/0156696 A1    May 27, 2021

(51) Int. Cl.
| | |
|---|---|
| *G01C 21/32* | (2006.01) |
| *G01C 21/36* | (2006.01) |
| *G06F 16/29* | (2019.01) |
| *G08G 1/01* | (2006.01) |
| *G08G 1/0967* | (2006.01) |

(52) U.S. Cl.
CPC ......... *G01C 21/32* (2013.01); *G01C 21/3658* (2013.01); *G01C 21/367* (2013.01); *G06F 16/29* (2019.01); *G08G 1/0112* (2013.01); *G08G 1/0129* (2013.01); *G08G 1/096716* (2013.01); *G08G 1/096775* (2013.01)

(58) Field of Classification Search
CPC .. G01C 21/32; G01C 21/3658; G01C 21/367; G06F 16/29; G08G 1/0112; G08G 1/0129; G08G 1/096716; G08G 1/096775
See application file for complete search history.

(56) References Cited

U.S. PATENT DOCUMENTS

| | | | |
|---|---|---|---|
| 6,560,529 B1 | 5/2003 | Janssen | |
| 8,694,255 B2 | 4/2014 | Mehr et al. | |
| 9,500,491 B2 | 11/2016 | Kratzsch et al. | |
| 2010/0274482 A1* | 10/2010 | Feng | G01C 21/3679 701/431 |
| 2011/0098912 A1* | 4/2011 | Baselau | G01C 21/34 701/532 |
| 2015/0211867 A1* | 7/2015 | Nagy | G06V 20/588 702/189 |
| 2015/0345974 A1* | 12/2015 | Takahashi | G01C 21/3602 701/461 |
| 2016/0034769 A1* | 2/2016 | Singh | G06V 20/582 348/148 |
| 2019/0195648 A1* | 6/2019 | Pogel | G01C 21/367 |

OTHER PUBLICATIONS

Zolotovitski et al., "Analysis of Potential to Improve Maps Using Car Probe Data", Proceedings of the 10th ACM SIGSPATIAL Workshop on Computational Transportation Science, Nov. 7, 2017, 6 pages.

\* cited by examiner

*Primary Examiner* — Angela Y Ortiz
*Assistant Examiner* — Charles Pall
(74) *Attorney, Agent, or Firm* — DITTHAVONG, STEINER & MLOTKOWSKI

(57) ABSTRACT

A system, a method, and a computer program product for validating a road sign are provided. The method comprises determining a transition location associated with the road sign using map data. The transition location is at least one of a map region start location or a map region end location. The method further comprises determining road sign data associated with the road sign using a sensor data cluster. The method further comprises determining a validity of the road sign based on the road sign data and the transition location.

20 Claims, 8 Drawing Sheets

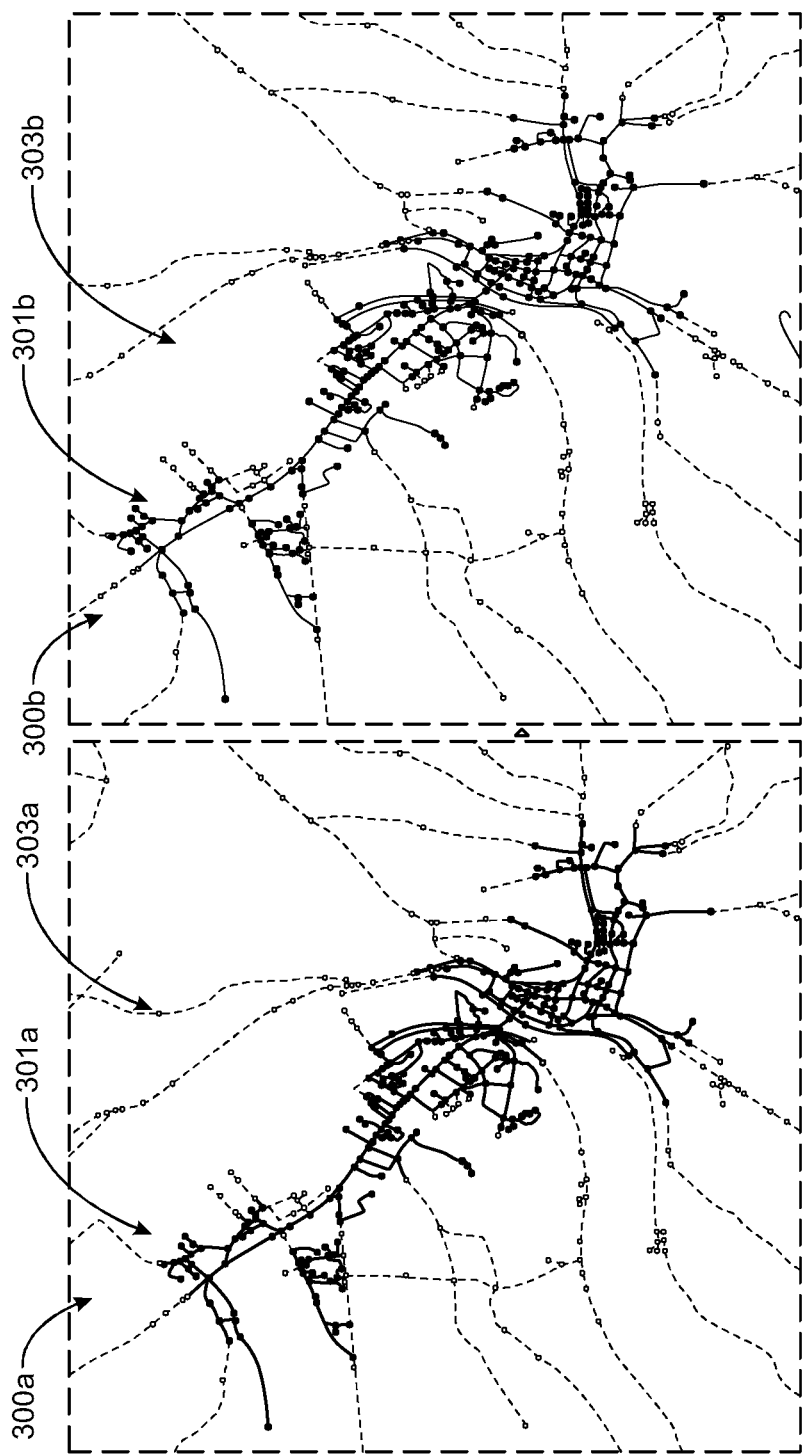

METHOD AND SYSTEM TO VALIDATE ROAD SIGNS

TECHNOLOGICAL FIELD

An example embodiment of the present invention generally relates to mapping and navigation applications, and more particularly relates to identifying road signs for mapping and navigation applications.

BACKGROUND

Various navigation applications are available to provide assistance to a user, for example, for providing directions for driving, walking, or other modes of travel. Some of these navigation applications may be web-based or mobile app-based systems, which may be configured to offer navigation applications that allow a user to request directions from one point to another. Further, navigation devices based on Global Positioning System (GPS) technology have also become common for offering navigation applications, and these devices are often used to provide directions to drivers, pedestrians, cyclists, and the like. For example, in autonomous or semi-autonomous driving applications, the navigation devices may offer driving directions and, further, even control driving maneuvers based on the directions and assistance functions provided by these navigation devices. Oftentimes, the navigation devices may be in communication with a mapping application, such as provided by a third party map service provider and may request map data from the mapping application to receive navigation assistance. In response to this request, the map data may be generated for a region associated with a position of the user associated with the navigation device, such as a user of a vehicle in which a navigation device may be installed.

Quite often, such map data may be updated less frequently, and thus may not have real-time updates associated with the region. As such, the map data may not reflect recent updates associated with changes in road signs of the region. In order to provide reliable navigation assistance, it is important to accurately determine the road signs of the region in near real-times. In certain scenarios, various sensors may be employed to detect road signs associated with the region based on sign boards posted on the roads. However, such a solution may not be viable to provide reliable navigation assistance as the sensors may misclassify signs not related to navigation as a road sign. Further such misclassifications may result in significantly large amount of data to be processed by a server which collects the data from the sensors and may hinder the processing speed and performance of the server.

BRIEF SUMMARY

Accordingly, there is a need for accurate identification and validation of the road signs in an efficient manner for providing reliable, secure, and robust navigation applications.

A system, a method, and a computer program product are provided herein for validating a road sign. Embodiments of the disclosure provide a system for validating a road sign. The system may include at least one non-transitory memory configured to store computer program code instructions, and at least one processor configured to execute the computer program code instructions to at least: determine a transition location associated with the road sign using map data, determine road sign data associated with the road sign using a sensor data cluster and determine a validity of the road sign based on the road sign data and the transition location.

According to some example embodiments, the transition location is at least one of a map region start location or a map region end location.

According to some example embodiments, the road sign data comprises a road sign type.

According to some example embodiments, the road sign type comprises one of a region start sign or a region end sign.

According to some example embodiments, the at least one processor may be configured to determine at least one upstream link and at least one downstream link associated with a connecting location of the map data and determine if the connecting location is the transition location based on a comparison of the at least one upstream link with a built up area link and a non-built up area link and the at least one downstream link with the built up area link and the non-built up area link.

According to some example embodiments, the at least one processor may further be configured to classify the transition location as the map region start location if the at least one upstream link is the non-built up area link and the at least one downstream link is the built up area link.

According to some example embodiments, the at least one processor may be configured to classify the transition location as the map region end location if the at least one upstream link is the built up area link and the at least one downstream link is the non-built up area link.

According to some example embodiments, the sensor data cluster comprises a cluster of road sign observations based on a predefined distance criteria.

According to some example embodiments, the predefined distance criteria comprises a configurable distance threshold.

According to some example embodiments, the configurable distance threshold comprises a numerical value specifying a distance of separation between a road sign location and the transition location.

According to some example embodiments, the at least one processor may be configured to determine if the road sign type is region start sign from sensor data cluster, determine if at the transition location there is a transition from a non-built up area link to a built up area link using the map data and determine the validity of the road sign as an acceptable road sign if it is determined that at the transition location there is a transition from a non-built up area link to a built up area link.

According to some example embodiments, the at least one processor may be configured to determine if the road sign type is region start sign from sensor data cluster, determine if at the transition location there is a transition from a non-built up area link to a built up area link using the map data and reject the road sign as an invalid road sign if it is determined that at the transition location there is not a transition from a non-built up area link to a built up area link.

According to some example embodiments, the at least one processor may be further configured to determine if the road sign type is region end sign from sensor data cluster, determine if at the transition location there is a transition from a built up area link to a non-built up area link using the map data and validate the road sign as an acceptable road sign if it is determined that at the transition location there is a transition from a built up area link to a non-built up area link.

According to some example embodiments, the at least one processor may be configured to determine if the road sign type is region end sign from sensor data cluster, determine if at the transition location there is a transition from a built up area link to a non-built up area link using the map data and reject the road sign as an invalid road sign if it is determined that at the transition location there is not a transition from a built up area link to a non-built up area link.

According to some example embodiments, the at least one processor may be configured to update the map data based on the validity of the road sign.

According to some example embodiments, the at least one processor may be further configured to update the transition location associated with the map data, wherein the transition location comprises at least one of the map region start location or the map region end location.

According to some example embodiments, the map data comprises a map data timestamp.

According to some example embodiments, the sensor data comprises a sensor data timestamp.

According to some example embodiments, the map data timestamp is earlier in time than the sensor data timestamp.

Embodiments of the disclosure also provide a method for validating a road sign. The method may comprise: determining a transition location associated with the road sign using map data, determining road sign data associated with the road sign using a sensor data cluster and determining, by at least one processor, a validity of the road sign based on the road sign data and the transition location.

According to some example embodiments, the transition location is at least one of a map region start location or a map region end location.

According to some example embodiments, the road sign data comprises a road sign type.

According to some example embodiments, the road sign type comprises one of a region start sign or a region end sign.

Embodiments of the disclosure further provide another method for validating a road sign. The method may comprise: obtaining sensor data associated with the road sign, determining one of a region start indicator or a region end indicator, based on the sensor data, determining link data associated with the road sign and determining a validity of the road sign, based on the one of the region start indicator or a region end indicator and the link data associated with the road sign.

BRIEF DESCRIPTION OF THE DRAWINGS

Figure 1A:
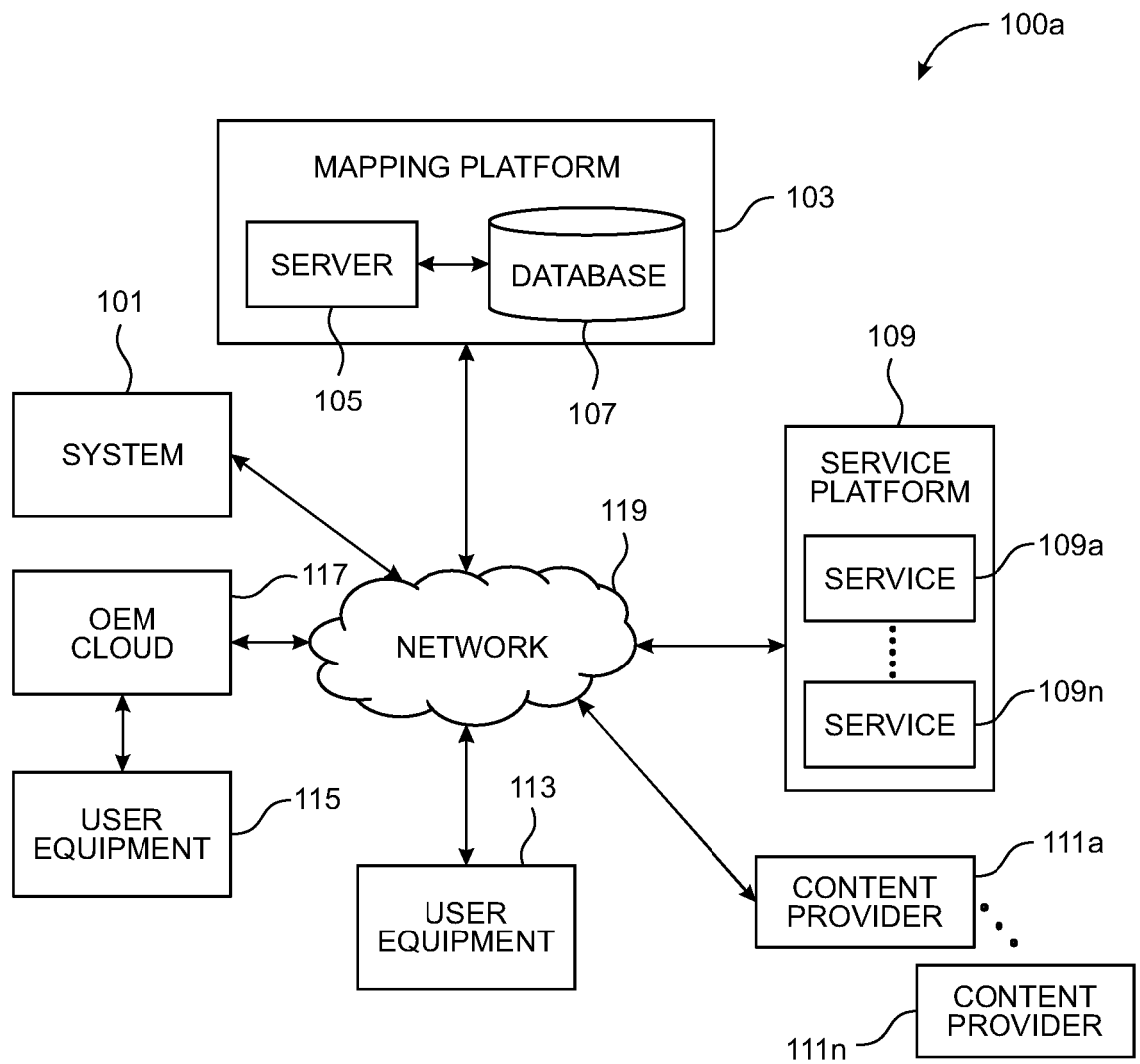
Figure 1B:
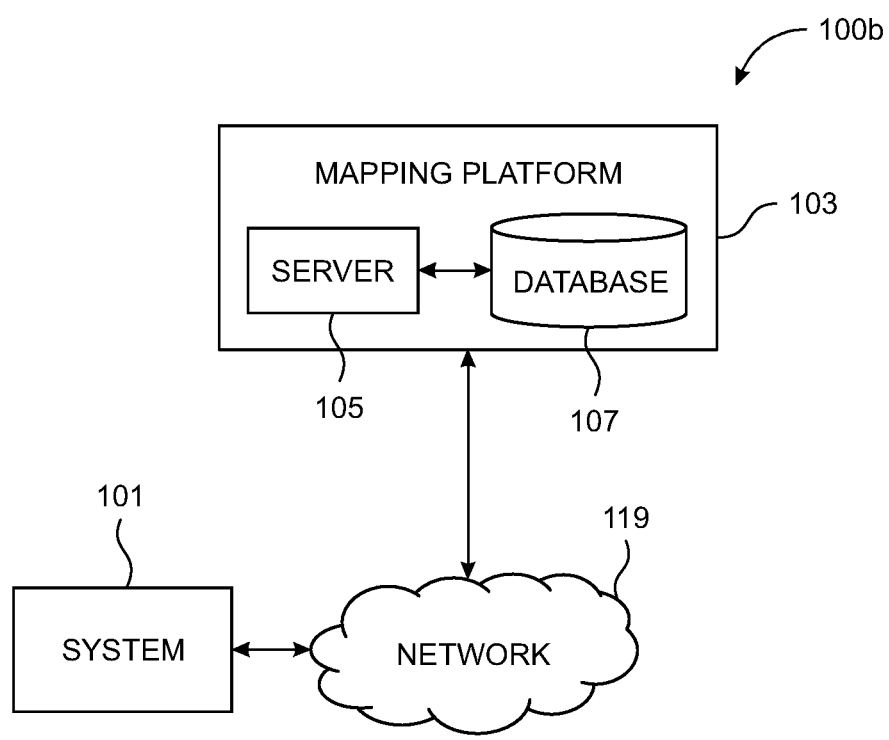
Figure 2:
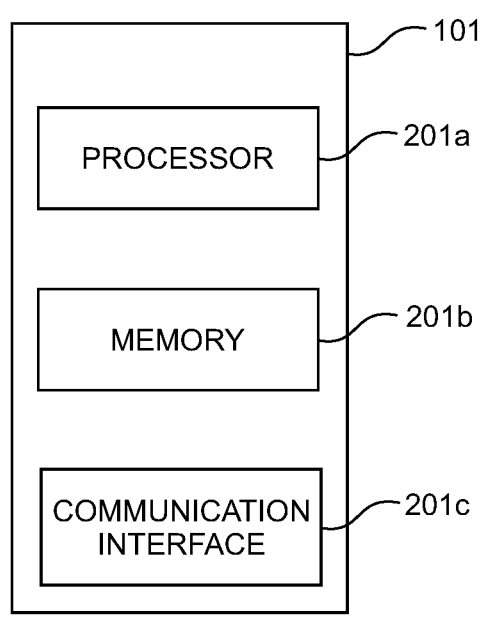
Figure 5:
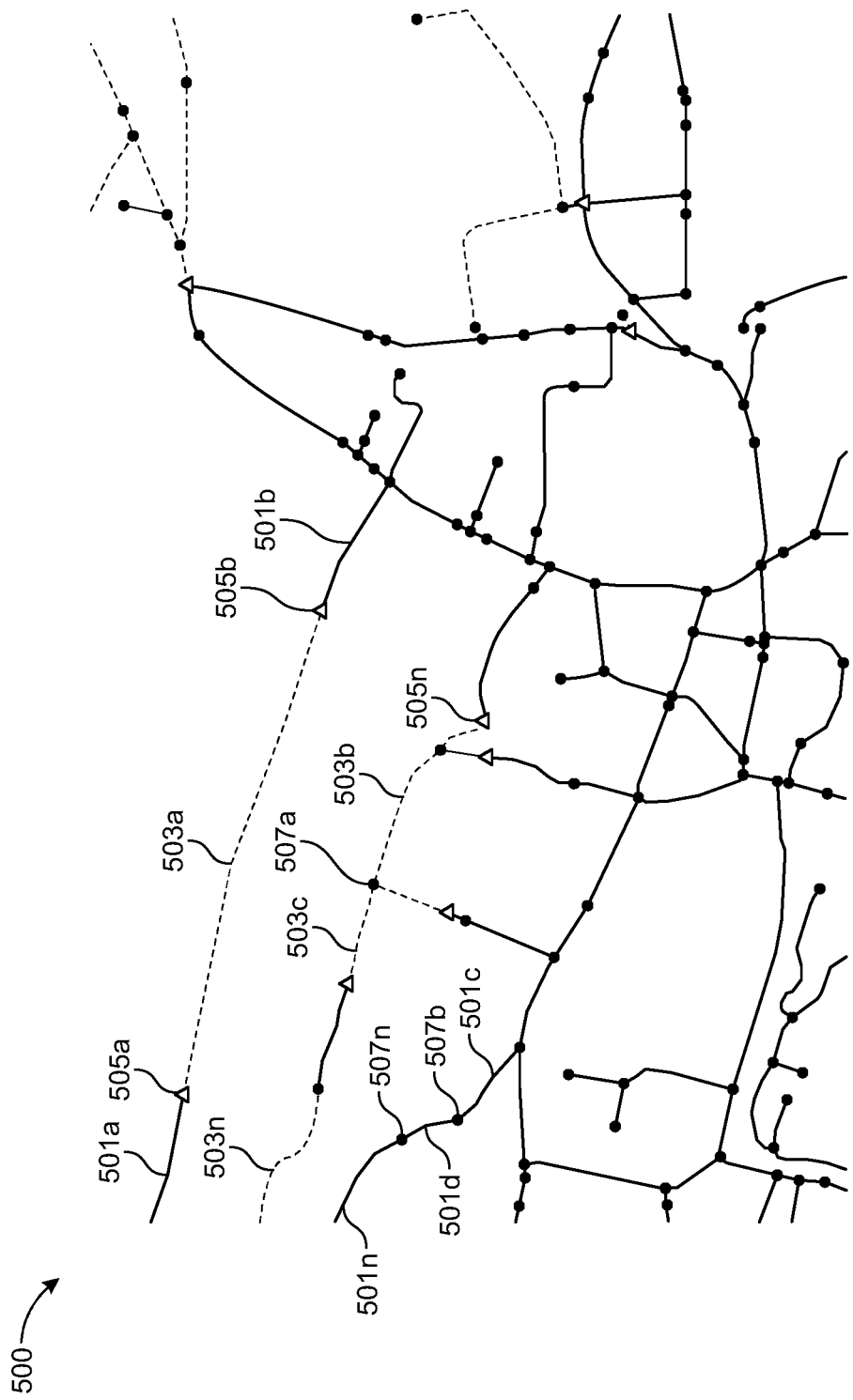
Figure 6:
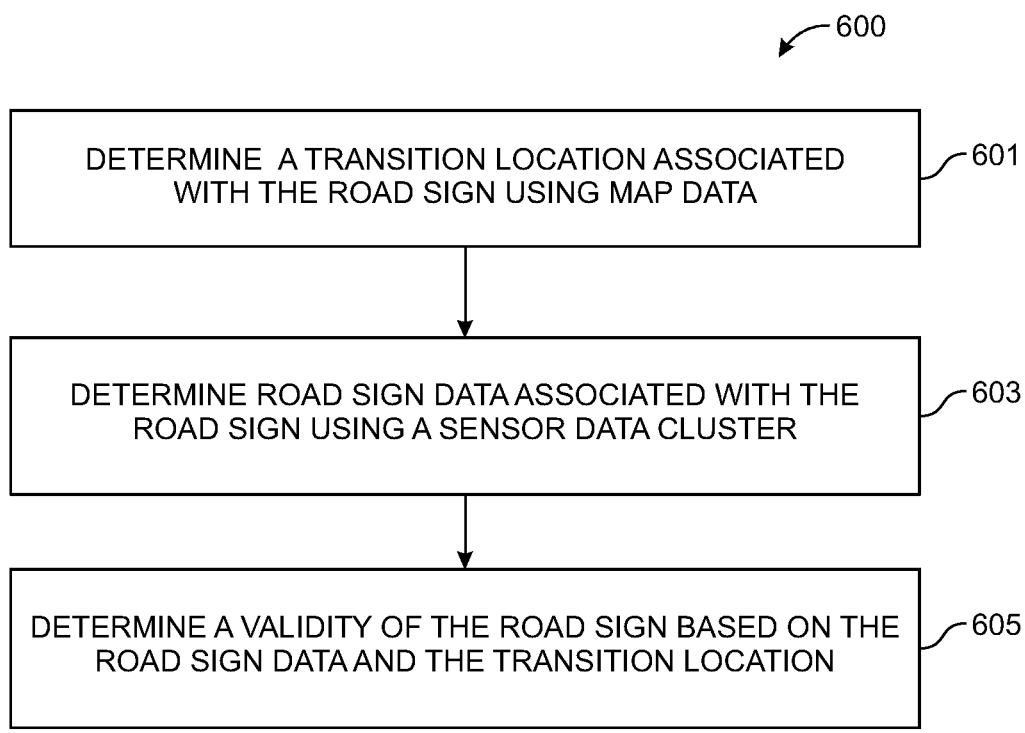
Figure 7:
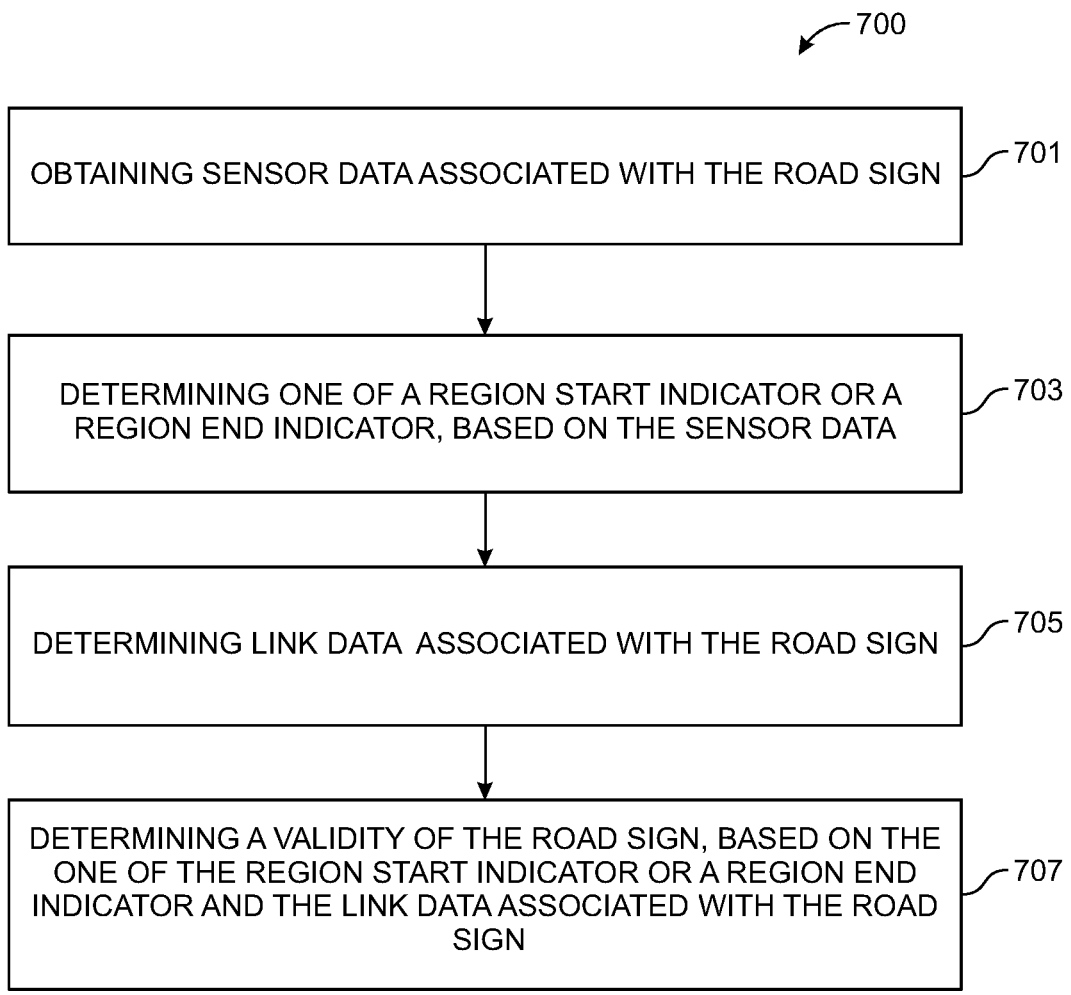

Having thus described example embodiments of the invention in general terms, reference will now be made to the accompanying drawings, which are not necessarily drawn to scale, and wherein:

FIG. 1A illustrates an exemplary architecture of a mapping application;

FIG. 1B illustrates a schematic diagram of a system for validating a road sign, in accordance with an example embodiment;

FIG. 2 illustrates a block diagram of the system for validating a road sign, in accordance with an example embodiment;

FIGS. 3A and 3B illustrate an exemplary scenario depicting a network of links, in accordance with an example embodiment;

FIGS. 4A-4D illustrate an exemplarily scenario depicting various types of road signs, in accordance with an example embodiment;

FIG. 5 illustrates an exemplary scenario of determination of map region indicator signs, in accordance with an example embodiment;

FIG. 6 illustrates a flowchart of operations performed by the system of FIG. 2 for validating a road sign, in accordance with an example embodiment; and FIG. 7 illustrates another flowchart of operations performed by the system of FIG. 2 for validating a road sign, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may refer to any connecting pathway including but not limited to a roadway, a highway, a freeway, an expressway, a lane, a street path, a road, an alley, a controlled access roadway, a free access roadway and the like.

The term "route" may refer to a path from a source location to a destination location on any link.

The term "autonomous vehicle" may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles.

The term "built-up area (BUA)" (interchangeably referred as "urban area") may refer to any region associated with a well-built infrastructure and high population density. The built-up area may include large density of built-up structures such as houses, commercial buildings, roads, bridges, railways and the like. In a non-limiting example, the built-up area may also refer to towns, cities, and suburbs or more specifically to the interior regions of towns, cities, and suburbs.

The term "non-built-up area (non-BUA)" (interchangeably referred as "non-urban area") may refer to any region associated with small infrastructure and low population density. The non-built up area may be a forest region or a region near the forest region. The non-built up area may include few groups of houses, farmlands, barren land and the like. In a non-limiting example, the non-built-up area may also refer to villages and deserted places, and regions at the exteriors of towns, cities, and suburbs.

The term "road sign" may refer to a sign positioned at the side of or above roads (such as on a gantry) to provide information to road users. The road signs may include but not limited to a static speed limit sign, a dynamic speed limit sign, a variable speed limit sign, a city start indicator sign, a city end indicator sign and the like.

The term "region indicator sign" may refer to signs positioned at the side of or above (such as on a gantry) roads to provide region boundary information to road users. The region indicator signs may include but not limited to region start sign, region end sign and the like.

The term "region start sign" may refer to a sign at a location or a point of location from where the respective region starts and the location or the point of location distinguishes the respective region from other neighboring regions. For example, the region start sign may be a city start indicator sign.

The term "region end sign" may refer to a sign at a location or a point of location where the respective region ends and the location or the point of location distinguishes the respective region from other neighboring regions. For example, the region end sign may be a city end indicator sign.

End of Definitions

Mapping and navigation applications generally use stored map content for providing navigation applications. The map content may be provided by map content providers, which may own one or more dedicated vehicles to provide real-time content for navigation applications. The dedicated vehicles may travel from one region to another region and gather sensor data comprising data about road signs posted on each road of the region. The map content providers utilize the sensor data gathered by sophisticated sensors of the dedicated vehicles to provide real-time map data to users of the navigation application. Typically, the number of dedicated vehicles providing content for the navigation application is insufficient. Thus, the map database of the navigation application may be updated less frequently, for example, once in a quarter of a year. Therefore, a user of the navigation application may not receive real-time updates on map data. Further, at times positions of road signs may change due to some reasons, such as construction, change in some city boundaries, updating of a road sign and the like. Such changes may not be reflected in map data immediately, because the map may be updated after a considerable time elapses since the update of the road sign. The fore said drawback may cause inconvenience to the user, when a road sign is misreported or misclassified, and further may lead to traffic disruptions. Certain road signs, such as a city start sign or a city end sign, may have implicit speed limit restrictions associated with them, which may be important for navigation applications. Accordingly, there is a need for an approach to provide the user of the navigation application with accurate real-time updates that reflect the recent changes in location of road signs associated with the region.

Further the map content providers may utilize OEM vehicles for providing content to the map database of the navigation application. The sensors of the OEM vehicles may detect road signs with low accuracy. The sensors of the OEM vehicles may misclassify some road signs due to their visual properties. Thus, utilization of the OEM vehicles for providing content for the map database may result in capturing of erroneous sensor data. The map database when updated by the erroneous sensor data may provide the user with incorrect navigation information. The erroneous sensor data may thus lead to an error in decision making for maneuvering of the user vehicle and may also lead to accidents in certain scenarios. Accordingly, there is a need for providing accurate road sign data in real-time.

A method, system, and computer program product are provided herein in accordance with an example embodiment for validating a road sign. In some example embodiments, the method, system, and computer program product provided herein may also be used for enhancing the accuracy of road sign determination using sensor data. The method, system, and computer program product disclosed herein provide measures for ensuring high accuracy in learning a road sign for navigation applications. In some embodiments, the learned road signs may be used to update the data stored in the map database. Therefore, embodiments of the present disclosure also provide for availability of highly reliable map data that may be used for high-end applications such as including, but not limited to, autonomous or self-driving vehicles.

According to an example embodiment, the method, system, and computer program product disclosed herein may provide for sending a notification message for the updated map database on the validated road signs. The notification message may for example, inform a vehicle about availability of accurate and up to date map data for a region. Alternately, the available up to date map data may be pushed as an update to the vehicle. In this way, a beneficiary of the map data (such as the vehicle) can be provided with highly accurate navigation assistance based on the updated map data. These and other technical improvements of the invention will become evident from the description provided herein.

FIG. 1A illustrates an exemplary architecture 100a of a mapping application, such as for validating a road sign. The system 101 may be communicatively coupled to one or more of a mapping platform 103, a service platform 109, a plurality of content providers 111a . . . 111n, a user equipment (UE) 113, and an OEM cloud 117 connected to a UE 115, via a network 119. The mapping platform 103 may include a server 105 and a database 107. Further, the server 105 and the database 107 may be communicatively coupled to each other. The service platform 109 may comprise a plurality of services 109a . . . 109n. The mapping platform 103 may be communicatively coupled to the services platform 109 and the plurality of content providers 111a . . . 111n, via the network 119. Further, the services platform 109 and the plurality of content providers 111a . . . 111n may be communicatively coupled to each other. In some example embodiments, a user equipment such as the user equipment 113 may be communicatively coupled to the mapping platform 103, directly via the network 119. Additionally, or alternatively, in some example embodiments, a user equipment such as the user equipment 115 may be communicatively connected to the OEM cloud 117 which in turn may be accessible to the mapping platform 103 via the network 119. All the components in the architecture 100a may be coupled directly or indirectly to the network 119. The components described in the architecture 100a may be further broken down into more than one component and/or combined together in any suitable arrangement. Further, one or more components may be rearranged, changed, added, and/or removed. Furthermore, fewer or additional components may be in communication with the system 101, within the scope of this disclosure.

The system 101 may be embodied in one or more of several ways as per the required implementation. For example, the system 101 may be embodied as a cloud based service or a cloud based platform. As such, the system 101 may be configured to operate outside the user equipment 113 and/or 115. However, in some example embodiments, the system 101 may be embodied within the user equipment 113 and/or 115, for example as part of an in-vehicle navigation system. In each of such embodiments, the system 101 may be communicatively coupled to the components shown in FIG. 1A to carry out the desired operations and wherever required modifications may be possible within the scope of the present disclosure.

The mapping platform 103 may comprise suitable logic, circuitry, interfaces and code that may be configured to store map data associated with the one or more road objects and map features. The server 105 of the mapping platform 103 may comprise processing means and communication means. For example, the processing means may comprise one or more processors configured to process requests received from the system 101 and/or the user equipment 113, 115. The processing means may fetch map data from the database 107 and transmit the same to the system 101 and/or the user equipment 113, 115 in a suitable format. In one or more example embodiments, the mapping platform 103 may periodically communicate with the user equipment 113 or 115 via the processing means to update a local cache of the map data stored on the user equipment 113, 115. Accordingly, in some example embodiments, map data may also be stored on the user equipment 113, 115 and may be updated based on periodic communication with the mapping platform 103.

The database 107 of the mapping platform 103 may store map data of one or more geographic regions such as a region, province, country, city, town, suburban area or of the entire world. The database 107 may store point cloud data collected from the user equipment 113 and/or 115. The database 107 may store node data, road segment data, link data, point of interest (POI) data, link identification information, heading value records, map region start location, map region end location, BUA data, non-BUA data and the like. The database 107 may also store cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database 107 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 107 may also store data about the POIs and their respective locations in the POI records. The database 107 may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a region). In addition, the database 107 may include event data (e.g., traffic incidents, construction activities, scheduled events, unscheduled events, accidents, diversions etc.) associated with the POI data records or other records of the database 107. Optionally or additionally, the database 107 may store 3D building maps data (3D map model of objects) of structures surrounding roads and streets.

The database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 113, 115. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 107 may be a master geographic database, but in alternate embodiments, the database 107 may be embodied as a client-side map database and may represent a compiled navigation database that may be used in or with end user devices (such as user equipment 113, 115) to provide navigation and/or map-related functions. In such a case, the database 107 may be downloaded or stored on the end user devices (such as user equipment 113, 115).

The services platform 109 may provide navigation related functions and the plurality of services 109a . . . 109n to the user equipment 113, 115. The plurality of services 109a . . . 109n may include navigation functions, speed adjustment functions, traffic related updates, weather related updates, warnings and alerts, parking related services and indoor mapping services. In accordance with an embodiment, the plurality of services 109a . . . 109n may be provided by the plurality of content providers 111a . . . 111n. In some examples, the plurality of content providers 111a . . . 111n may access various Software Development Kits (SDKs) from the services platform 109 for implementation of the plurality of services 109a . . . 109n. In accordance with an embodiment, the services platform 109 and the mapping platform 103 may be integrated into a single platform to provide a suite of mapping and navigation related applications for OEM devices, such as the user equipment 115. The user equipment 113, 115 may be configured to interface with the services platform 109, the plurality of content provider 111a . . . 111n, and the mapping platform 103 over the network 119. Thus, the mapping platform 103 and the services platform 109 may enable provision of cloud-based services for the user equipment 113, 115, such as, storing the sensor data in the OEM cloud 117 in batches or in real-time and retrieving the stored sensor data for determining road sign associated with the region using captured images of one or more road objects such as images of boards posted on road.

The plurality of content providers 111a . . . 111n may be configured to maintain data stored in the database 107. The plurality of content provider 111a . . . 111n such as a map developer may maintain the mapping platform 103. By way of example, the map developer may collect geographic data to generate and enhance the mapping platform 103. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example, the map developer may use special purpose vehicles called probe vehicles for gathering map related data. Crowdsourcing of geographic map data may also be employed to generate, substantiate, or update map data. Crowdsourcing may be based on gathering data using customer vehicles. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform the database 107 of features within an environment that are appropriate for mapping. For example, motion sensors, inertia sensors, image capture sensors, proximity sensors, LiDAR (light detection and ranging) sensors, ultrasonic sensors etc. The gathering of large quantities of crowd-sourced data may facilitate the accurate modeling and mapping of an environment, whether it is a road segment, a road sign or the interior of a multi-level parking structure. Also, remote sensing, such as aerial or satellite photography, may be used to generate map geometries directly or through machine learning as described herein.

The user equipment 113, 115 may be any user accessible device such as a mobile phone, a smartphone, a portable computer, and the like that is portable in itself or as a part of another portable/mobile object such as a vehicle. In some example embodiments, user equipment 113, 115 may be vehicles. Accordingly, hereinafter the user equipment 113, 115 may also be referred to as vehicles 113, 115. The user equipment 113, 115 may comprise a processor, a memory and a communication interface. The processor, the memory and the communication interface may be communicatively coupled to each other. In some example embodiments, the user equipment 113, 115 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. As such, the user equipment 113, 115 may be an autonomous vehicle, a semi-autonomous vehicle or a manually driven vehicle. In such example embodiments, the user equipment 113, 115 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 113, 115. Additional, different, or fewer components may be provided. For example, the user equipment 113, 115 may be configured to execute and run mobile applications such as a messaging application, a browser application, a navigation application, and the like. At least one user equipment such as user equipment 113 may be directly coupled to the system 101 via the network 119. For example, the user equipment 113 may be a dedicated vehicle (or a part thereof) for gathering data for development of the map data in the database 107. In some example embodiments, the user equipment 115 may be coupled to the system 101 via the OEM cloud 117 and the network 119. For example, the user equipment 115 may be a consumer vehicle (or a part thereof) and may be a beneficiary of the services provided by the system 101 and/or the mapping platform 103. In some example embodiments, one or more of the user equipment 113 and 115 may serve the dual purpose of a data gatherer and a beneficiary device. The user equipment 113 or 115 may be configured to capture sensor data associated with a road which the user equipment 113, 115 may be traversing. The sensor data may for example be image data of road objects, road signs, or the surroundings (for example buildings, road objects, and the like).

The sensor data may refer to sensor data collected from a sensor unit in the user equipment 113 or the user equipment 115. In accordance with an embodiment, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modeling for various fields. In a 3D Cartesian coordinates system, a point is identified by three coordinates that, taken together, correlate to a precise point in space relative to a point of origin. The LiDAR point cloud data may include point measurements from real-world objects or photos for a point cloud data that may then be translated to a 3D mesh or NURBS or CAD model. In accordance with an embodiment, the sensor data may be converted to units and ranges compatible with the mapping platform 103, to accurately receive the sensor data.

The network 119 may comprise suitable logic, circuitry, and interfaces that may be configured to provide a plurality of network ports and a plurality of communication channels for transmission and reception of data, such as the sensor data, map data from the database 107, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 119 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 119 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

FIG. 1B illustrates a schematic diagram of another network environment 100b of the system 101 for validating a road sign, in accordance with an example embodiment. The system 101 may be communicatively coupled to one or more of the mapping platform 103 via the network 119. The mapping platform 103 may include the server 105 and the database 107. Further, the server 105 and database 107 may be communicatively coupled to each other. In some example embodiments, the system 101 may be a user equipment such as the user equipment 113 disclosed earlier and may be communicatively coupled to the mapping platform 103, directly via the network 119. Additionally, or alternatively, in some example embodiments, the system 101 may be a user equipment such as the user equipment 115 disclosed earlier and may be communicatively connected to the OEM cloud 117 which in turn may be accessible to the mapping platform 103 via the network 119. All the components in the network environment 100b may be coupled directly or indirectly to the network 119. Components described in the network environment 100b may be further broken down into more than one component and/or combined together in any suitable arrangement. Further, one or more components may be rearranged, changed, added, and/or removed. Furthermore, fewer or additional components may be in communication with the system 101, within the scope of this disclosure.

In some example embodiments, the system 101 may be configured to obtain sensor data associated with a road sign. The system 101 may have in-built sensors to capture the sensor data and/or may obtain the sensor data from vehicles traversing on a road. In some alternate embodiments, the system 101 may obtain the sensor data from a sensor unit/cluster that is communicatively coupled to the system 101. Further the system 101 may filter the sensor data and cluster the filtered sensor data to obtain one or more sensor data clusters. The system 101 may further obtain map data from a map database, such as the database 107 via the network 119. The system may be configured to determine validity of the obtained sensor data by performing various operations as explained in detail in various embodiments of the present disclosure. Further, the system 101 may be configured to update the map data of the map database 107. The system 101 may update the map data of the map database 107 based on the determined validity of the obtained sensor data.

In some example embodiments, the mapping platform 103 may be configured to provide the updated map data to the system 101.

In some example embodiments, the map database 107 may store information about each link associated with a region. For example, the map database 107 may store information about a map region start sign and a map region end sign associated with the region.

In some example embodiments, the system 101 may be configured to validate data about road signs using map data stored in the map database 107, as discussed in conjunction with the various embodiments of the present invention disclosed herein.

FIG. 2 illustrates a block diagram of the system 101 for validating a road sign, in accordance with an example embodiment. The system 101 may comprise a processing means such as processor 201a, storage means such as memory 201b, and a communication means such as communication interface 201c. The processor 201a may retrieve computer program code instructions that may be stored in the memory 201b for execution of the computer program code instructions.

The processor 201a may be embodied in a number of different ways. For example, the processor 201a may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201a may include one or more processing cores configured to perform independently. A multi-core processor may enable multiprocessing within a single physical package. Additionally, or alternatively, the processor 201a may include one or more processors configured in tandem via the bus to enable independent execution of instructions, pipelining and/or multithreading. Additionally, or alternatively, the processor 201a may include one or more processors capable of processing large volumes of workloads and operations to provide support for big data analysis. In an example embodiment, the processor 201a may be in communication with a memory 201b via a bus for passing information among components of the system 101.

The memory 201b may be non-transitory and may include, for example, one or more volatile and/or non-volatile memories. In other words, for example, the memory 201b may be an electronic storage device (for example, a computer readable storage medium) comprising gates configured to store data (for example, bits) that may be retrievable by a machine (for example, a computing device like the processor 201a). The memory 201b may be configured to store information, data, content, applications, instructions, or the like, for enabling the apparatus to carry out various functions in accordance with an example embodiment of the present invention. For example, the memory 201b could be configured to buffer input data for processing by the processor 201a. As exemplarily illustrated in FIG. 2, the memory 201b may be configured to store instructions for execution by the processor 201a. As such, whether configured by hardware or software methods, or by a combination thereof, the processor 201a may represent an entity (for example, physically embodied in circuitry) capable of performing operations according to an embodiment of the present invention while configured accordingly. Thus, for example, when the processor 201a is embodied as an ASIC, FPGA or the like, the processor 201a may be specifically configured hardware for conducting the operations described herein. Alternatively, as another example, when the processor 201a is embodied as an executor of software instructions, the instructions may specifically configure the processor 201a to perform the algorithms and/or operations described herein when the instructions are executed. However, in some cases, the processor 201a may be a processor specific device (for example, a mobile terminal or a fixed computing device) configured to employ an embodiment of the present invention by further configuration of the processor 201a by instructions for performing the algorithms and/or operations described herein. The processor 201a may include, among other things, a clock, an arithmetic logic unit (ALU) and logic gates configured to support operation of the processor 201a.

In some embodiments, the processor 201a may be configured to provide Internet-of-Things (IoT) related capabilities to users of the system 101 disclosed herein, such as, speed limit recommendations to the user or automatic speed adjustments for autonomous vehicles. The IoT related capabilities may in turn be used to provide smart region solutions by providing route selection updates, big data analysis, and sensor-based data collection by using the cloud based mapping system for providing navigation and route recommendation services to the autonomous delivery vehicle. In some embodiments, the system 101 may be configured to provide an environment for development of real time speed update recommendation and the best possible route selection strategy recommendation solutions for navigation systems in accordance with the embodiments disclosed herein. In some embodiments, the system 101 may be configured to learn data related to a road sign, and accordingly suggest a speed limit to be followed in that region. In some embodiments, the system 101 may be configured to update the data related to the road signs in a map database. The environment may be accessed using the communication interface 201c.

The communication interface 201c may comprise input interface and output interface for supporting communications to and from any component with which the system 101 may communicate. The communication interface 201c may comprise a sensor unit which collects the sensor data. The communication interface 201c may be any means such as a device or circuitry embodied in either hardware or a combination of hardware and software that is configured to receive and/or transmit data to/from a communications device. In this regard, the communication interface 201c may include, for example, an antenna (or multiple antennae) and supporting hardware and/or software for enabling communications with a wireless communication network. Additionally, or alternatively, the communication interface 201c may include the circuitry for interacting with the antenna(s) to cause transmission of signals via the antenna(s) or to handle receipt of signals received via the antenna(s). In some environments, the communication interface 201c may alternatively or additionally support wired communication. As such, for example, the communication interface 201c may include a communication modem and/or other hardware and/or software for supporting communication via cable, digital subscriber line (DSL), universal serial bus (USB) or other mechanisms.

In some example embodiments, the communication interface 201c may be configured to enable the system 101 to exchange data with the mapping platform 103, such as for obtaining map data stored in the map database 107. In some example embodiments, the map data may include data about various geographical regions such as geographical maps of countries, cities, towns, suburbs and the like. The map data of various geographical regions may be stored in the form of a network of links, wherein the links define the interiors of a geographical region, as illustrated in FIGS. 3A and 3B.

FIGS. 3A and 3B illustrate an exemplary scenario depicting a network of links 300a and 300b, respectively. For example, the network of links 300a and 300b may correspond to a network of roads on which road signs may be posted. In some example embodiments, the network of links 300a and 300b may correspond to links defining the boundaries and interior regions of a geographic region, such as a country, a city, a town, a suburb and the like. The network of links 300*a* as exemplarily illustrated in FIG. 3A, may comprise BUA links (interchangeably used with built up area links) 301*a* and/or non-BUA links (interchangeably used with non-built up area links) 303*a*. The BUA links 301*a* may be a set of links associated with a built-up area identifier and the non-BUA links 303*a* may be a set of links associated with a non-built-up area identifier. The network of links 300*b* as exemplarily illustrated in FIG. 3B may comprise urban links 301*b* and/or non-urban links 303*b*. The urban links 301*b* may be a set of links associated with an urban area identifier and the non-urban links 303*b* may be a set of links associated with a non-urban area identifier. The built up area identifier and the urban area identifier of the links may indicate that the geographical coordinates of the link lie in the built up area region. Further the non-built up area identifier and the non-urban area identifier of the links may indicate that the geographical coordinates of the link lie in the non-built up area region. The FIG. 3A and FIG. 3B show similarity between the network of links 300*a* and the network of links 300*b*. For example, each link in the network of links 300*a* has a similar and corresponding link in the network of links 300*b* as may be observed from FIG. 3A and FIG. 3B. In some example embodiments the BUA links 301*a* may correspond to urban links 301*b*. Therefore hereinafter, the BUA links 301*a* and the urban links 301*b* may be used interchangeably and referred to as BUA link 301 or urban link 301. In some example embodiments the non-BUA links 303*a* may correspond to the non-urban links 303*b*. Therefore hereinafter, the non-BUA links 303*a* and the non-urban links 303*b* may be used interchangeably and referred to as non-BUA link 303 or non-urban link 303.

According to some example embodiments, an implicit speed limit may be associated with each of the built up area link 301 and/or the non-built up area link 303. The implicit speed limit may not be a physical board posted on the roads (interchangeably used with the network of links 300*a* and 300*b*). However, the implicit speed limit may impose a restriction on speed of a vehicle (such as the user equipment 113, 115) traversing on the road. For example, each link associated with the built-up area identifier and/or urban area identifier may be a busy link associated with high traffic volume of vehicles. Thus, the built up area links 301 may have a low speed limit to ensure safe navigation of the vehicles. Further, each link associated with the non-built-up area identifier and/or non-urban area identifier may be a link associated with light traffic volume of vehicles. Thus, the non-built up area links 303 may have a high speed limit to ensure smooth and quick navigation of the vehicles. Accordingly, the vehicles traversing in the built up area link 301 may increase speed of traversal on reaching the non-built up area link 303 and the vehicles traversing in the non-built up area link 303 may decrease speed of traversal on reaching the built up area link 301. The implicit speed limit associated with each of the built up area link 301 and/or the non-built up area link 303 may be identified by a road sign (such as a region start sign or a region end sign) posted on the links of the network of links 300*a* and 300*b*. The speed limit associated with a link is important for maneuvering of vehicles, particularly vehicles such as autonomous vehicles that have speed limit based control. Therefore, accurate determination of the road signs is of utmost importance.

Figure 4A:
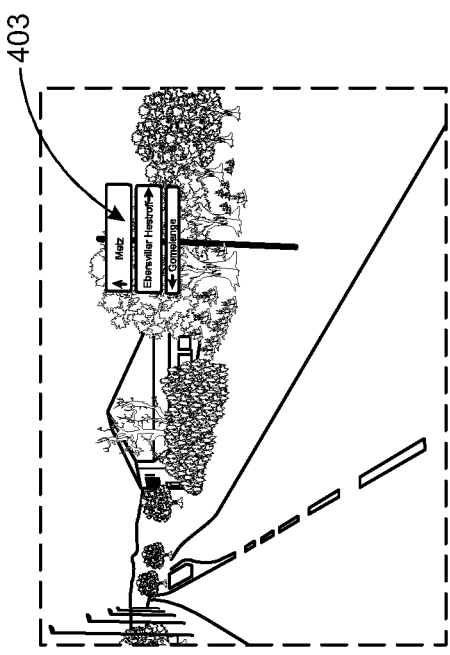
Figure 4B:
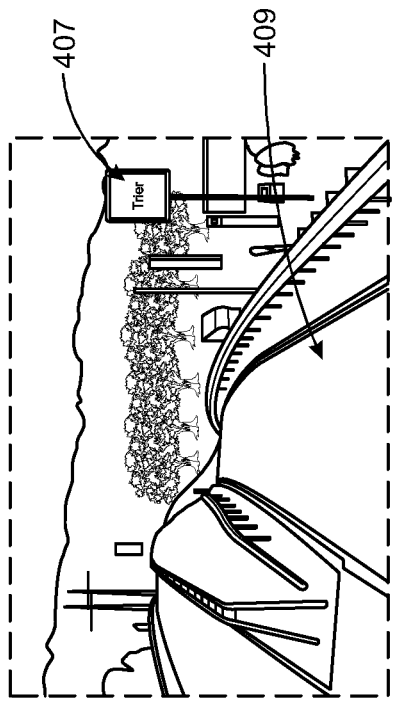
Figure 4C:
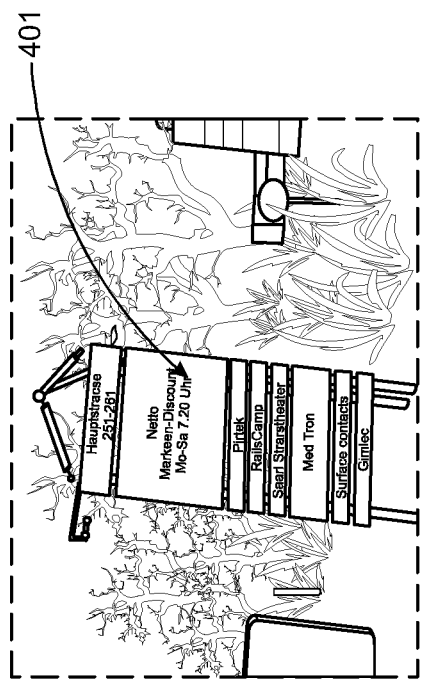
Figure 4D:
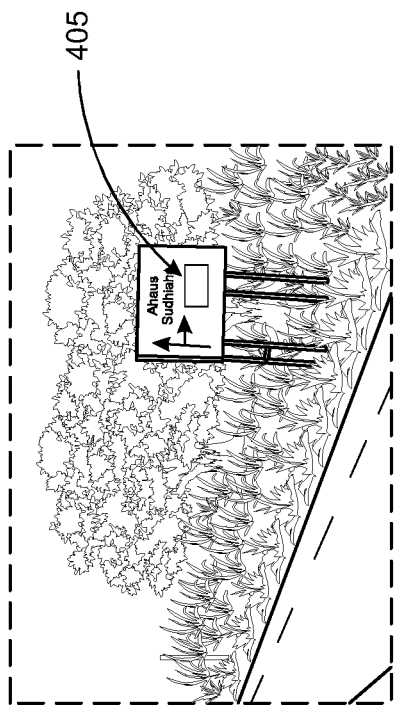

FIGS. 4A-4D illustrate an exemplarily scenario depicting various types of road signs used in one or more embodiments of the present invention. FIGS. 4A and 4B illustrate an exemplary scenario depicting a problem of inaccurate recognition of road signs by the sensors associated with a vehicle (such as the user equipment 113, 115) traversing a road (such as the network of links 300*a* and 300*b*). The vehicle may be travelling on the road on which one or more road signs (for example, at least one of a region start sign or a region end sign) may be posted. Further, other road signs not associated with the navigation application (for example, signs other than the region start sign and the region end sign such as an advertisement board etc.) may be posted on the same road. The sensors associated with the vehicle may be configured to capture the road signs. The vehicle may process the captured road signs and report them as being posted on the road on which the vehicle may be traversing. However, the road signs not associated with the navigation application may also fall in view of the sensors and may thus be wrongly classified by the sensors. For example, as shown in FIG. 4A the sensors may capture an advertisement board 401 and may wrongly classify it as a region indicator sign. Further, as illustrated in FIGS. 4B and 4C, in some embodiments, road signs indicating directions to a region, such as, 403 and 405 may also be wrongly classified as region indicator signs. Further as shown in FIG. 4D the sensors of a vehicle traversing on a freeway 409 may capture a road sign such as 407 which may be a city sign on the freeway, and may wrongly classify it as a speed limit sign. When such erroneous sign observation is learnt and is used to build/update a map database (such as the database 107 of the mapping platform 103) the map database cannot be regarded as reliable and users of such a map database may be provided with improper navigation assistance. Alternately, if the erroneous observation is utilized locally by the vehicle for performing navigation functions, the vehicle may not be able to correctly comprehend the sign observations which can lead to undesired situations such as accidents. Additionally, if such erroneous observation is used for maneuvering an autonomous vehicle, the resulting vehicle control may be dangerous and accident prone.

In some example embodiments, the system 101 may provide measures for rectifying the aforesaid erroneous data. For example, when the sign observation is reported at the mapping platform 103 for learning purposes, the mapping platform 103 may trigger and invoke the system 101 to generate accurate map data corresponding to the sign observation if it is found that the sign observation is likely prone to a potential erroneous data. Alternately, the system 101 may be invoked on demand or routinely to detect and correct the map data learnt for signs that may be prone to the erroneous data.

On being triggered, the system 101 may obtain map data (for example map region start data or map region end data) from the map database 107 for the corresponding signs in the sensor data. The map data of the sign observed may comprise geo-location, heading information, sign type, sign permanency, sign value and the like.

In some example embodiments, the system 101 may be used to provide accurate, reliable, and updated map data for the mapping platform 103 automatically and on a continuous basis. The system 101 may be configured to identify a map of a network of links, identify positions of region start and region end using the map, identify region start and region end signs using sensor data and improve the accuracy of the sensor data using the map data.

FIG. 5 illustrates an exemplary network of links 500 (such as the network of links 300*a*, 300*b*) in accordance with an exemplary embodiment. In some example embodiments, the network of links 500 may correspond to a map of a geographical region, such as a country, a city, a town, a suburban area and the like. The network of links 500 may be stored as a digital map in the mapping platform 103. In some example embodiments, network of links 500 may be stored as a digital map in the map database 107 of the mapping platform 103. As used herein, a digital map is map content of world in an image form. According to some example embodiments, a digital map is the map content of world in a cube form (a 3 dimensional representation). In various embodiments, the map content may include map features such as physical features on the ground (e.g., roads, buildings, and the like). In an embodiment, the digital map may be partitioned with 2 dimensions (in gridded form). According to some embodiments, each cell of the grid may indicate a map tile or a map region. In an embodiment, a shape of the cell may be a square, a rectangular, a pentagonal, or the like. The cell may cover a portion of geographical region (e.g., an area) of the digital map. In an example embodiment, the map tile may contain many links/route segments.

According to an example embodiment, each of the links of the network of links 500 may correspond to at least one of the built up area link 301 or the non-built up area link 303. Further, the map database 107 may store a direction attribute associated with each of the links of the network of links 500. For example, a single way road may have single direction attribute and a double way road may have two direction attributes. The solid lines (such as 501a, 501b, 501c, 501d, . . . 501n) may correspond to the at least one built up area link 301 and the dotted lines (such as 503a, 503b, 503c, . . . 503n) may correspond to the at least one non-built up area link 303. Further, a link may be classified as an upstream link, if the link extends in the opposite direction as a direction of travel, such as of a vehicle. Further, a link may be classified as a downstream link, if it extends in the same direction to the direction of travel, such as of vehicle. For example, for a vehicle traveling along a route from link 501a to 503a, the link 501a is the upstream link and the link 503a is the downstream link.

The system 101 may be configured to extract a pair of connecting links, such as the links 501a and 503a from the map database 107. Further, the system 101 may be configured to access geo-location of each of the links of the network of links 500 (such as network of links 300a, 300b). Further the system 101 may determine a connecting location connecting the links, such as locations (505a, 505b, . . . 505n) and locations (507a, 507b, . . . 507n) as a transition location based on the area identifier associated with each of the pair of extracted links. The area identifier may be at least one of a built up area identifier or a non-built up area identifier. For example, when an upstream link is the built up area link 501a and a downstream link is the non-built up area link 503a, the connecting location 505a may be determined as the map region end sign. Further, when the upstream link is the non-built up area link 503a and the downstream link is the built up area link 501b, the connecting location 505b may be determined as the map region start sign. The map region start sign or the map region end sign indicates actual location of region start sign and region end sign respectively as obtained using the map data. The region may be a city, a country, a township, a suburban area, a forest, a highland and the like. The region start sign, such as the city start sign may implicitly apply a speed limit value on vehicles driving through the city. Thus, it may be very important to determine the correct placement of the city start sign in many navigation applications.

In an alternate embodiment, for example, when the vehicle is traversing from the non-built up area link 503c to the non-built up area link 503b, the connecting location 507a may not be determined as either of the map region end sign or the map region start sign. Further, when the vehicle is traversing from the built up area link 501d to the built up area link 501c, the connecting location 507b may not be determined as either of the map region end sign or the map region start sign. According to an example embodiment, for the pair of connecting links with two different area identifiers, the connecting location may be determined as the map city start sign and the map city end sign.

Each of the triangle (such as 505a, 505b, . . . 505n) on the network of links 500 corresponds to a location connecting a non-built up area link to a built up area link and/or a built up area link to a non-built up area link and thus may be determined as at least one of the map region start sign and/or the map region end sign. Further each of the circle (such as 507a, 507b, . . . 507n) corresponds to a location connecting either a non-built up area link to another non-built up area link; or a built up area link to another built up area link, and thus, may not be determined as either of the map region start sign or the map region end sign. The determination of area identifiers and connecting locations associated with each of a pair of links as above may in turn be used for validating a road sign.

FIG. 6 illustrates a flow chart 600 of operations performed by the system 101 of FIG. 2 for validating a road sign, in accordance with an example embodiment. FIG. 6 is described in conjunction with the description of FIG. 3A-FIG. 5. Starting at block 601, the system 101 may be configured to determine a transition location associated with the road sign using map data. According to an example embodiment, the system 101 may be configured to receive map data from the map database 107 to determine the transition location as explained in detail in description of FIG. 5. The map data may include information of the links (such as the network of links 300a and 300b) associated with the road sign. The information may comprise attributes of the links, such as, geographical coordinate, number of lanes, built up area identifier, non-built up area identifier, functional class, a speed limit, a presence of a road sign, a bi-directionality, a number of lanes, a speed category, a distance to a point of interest, or a combination thereof. According to an example embodiment, the system 101 may be configured to extract a pair of connecting links from the map data. In some example embodiments, the extracted pair of links may be an upstream link and a downstream link connected to each other by a connecting location. The system 101 may be further configured to compare the area identifier of the upstream link and the downstream link with each of a built up area identifier and a non-built up area identifier. The system 101 may determine the connecting location as a transition location if the upstream link is non-built up area link and downstream link is built up area link or if the upstream link is built up area link and downstream link is non-built up area link. Further, in some example embodiments, the system 101 may classify the transition location as a map region start location (interchangeably referred as map region start sign) or map region end location (interchangeably referred as map region end sign) based on area identifier associated with the upstream link and the downstream link. For example, the system 101 may classify the transition location as a map region start location if the upstream link is non-built up area link and downstream link is built up area link. Further, the system 101 may classify the transition location as a map region end location if the upstream link is built up area link and downstream link is non-built up area link. The system 101 may thus classify the transition location of each pair of link from the network of links 300a and 300b as one of a map region start location and/or map region end location. For example, if at the transition location, there is a transition from non-built up area link to built up area link, it would indicate the start of a city. Similarly, if at the transition location there is a transition from built up are link to non-built up area link, it would indicate the end of a city. With the expansion and shrinking of the cities, these transitioning locations need to be updated. In some example embodiments, the system 101 may be configured to update data about the transition location in near real-time in a map database, such as the database 107, to increase the longitudinal accuracy of data about the transition location.

At block 603, the system 101 may be configured to determine road sign data associated with the road sign using a sensor data cluster. The sensor data cluster may be a cluster of sensor data observations obtained from the sensors associated with the vehicles.

According to an example embodiment, the sensor data may be obtained and stored in the memory of the system 101, such as memory 201*b*. Alternatively the sensor data may be processed in real-time by the system 101. The sensor associated with the vehicles may detect and capture the road signs (such as region start sign and region end sign) posted on the road traversed by the vehicle. In some example embodiments the sensors may also wrongly capture the other signs. The sensor data may comprise the road signs and/or the other signs captured by the sensors of the vehicle. Further, the sensor data may comprise road signs captured by multiple vehicles. The road signs may be the region start signs and/or the region end signs.

The region start sign may be a board posted on the road indicating start of a region. For example, the region start sign may be a road sign posted near entrance of the region. The region start sign may include but not limited name of the region, speed limit value permissible inside the region and the like. The region end sign may be a board posted on the road indicating end of the region. For example, the region end sign may be posted near exit of the region. The region end sign may indicate that the speed limit observed at start of the region is not applicable further. The sensors may report the sensor data to the system 101 via the network 119. In accordance with one or more embodiments each of the road sign in the sensor data may be associated with a timestamp corresponding to time of capture of the road sign and a location stamp indicating the geographical coordinate where the road sign was captured. There may be a distance offset between the location of road sign captured by the sensor and the corresponding transition location obtained from the map data.

The system 101 may be configured to filter a set of sensor data observations from the received sensor data observations. For example, the system 101 may filter a cluster of sensor data observations from the sensor data observations based on a distance criteria. The distance criteria may be a configurable distance threshold value. The distance threshold value specifies a permissible distance of separation between a road sign location and the transition location. The system 101 may be configured to access location stamps associated with each of the road signs in the sensor data and its corresponding map region indicator signs (such as map region start sign and map region end sign) obtained from the map data. The distance criteria may be a pre-established and/or a pre-defined value of distance. For example, in some cases the distance threshold may be 150 m. That is to say, sensor data observations including a road sign location which is within 150 m distance of a transition location of map, may be only considered. According to various embodiments, the system 101 may be configured to filter the set of sensor data from the sensor data observations based on the distance criteria being satisfied i.e. the offset between the road sign location and transition location being less than the distance threshold. The distance threshold may be a distance boundary specifying the distance within which the road signs may lie with respect to the corresponding transition location. For example, the road sign lying out of the distance boundary of the corresponding transition location may be removed.

According to an example embodiment, the road signs captured on certain roads may be removed automatically from the sensor data based on a functional class associated with the road. For example, the road signs captured from a freeway road may be automatically removed from the sensor data. According to some embodiments, the road signs may be removed based on a time stamp associated with each of the road signs of the sensor data. The time stamp associated with the road sign may indicate time of capture of the road sign by the sensors associated with the vehicle. The road signs with the time stamps indicating the period of capture as more than a period of day or a threshold number of days may be removed by the system 101. For example, the road signs with corresponding time stamps indicating a period of capture greater than twenty-four hours may be removed. According to an example embodiment, the threshold period to remove the region indicator signs from the sensor data may be pre-established or defined by the system 101. Further, the system 101 may be configured to obtain the time stamp associated with each of the map region start sign and the map region end sign. The time of determination and/or updating as indicated by the time stamps of the map region indicator signs of the map data may be prior to the time indicated by the time stamps associated with the region indicator signs of the sensor data.

The system 101 may be further configured to generate one or more clusters of the filtered sensor data. The system 101 may be configured to utilize a clustering algorithm to generate clusters of the set of sensor data. Some non-limiting examples of clustering algorithms may be, for example, K-means clustering, mean-shift clustering, Density-Based Spatial Clustering of Applications with Noise (DBSCAN), Expectation-Maximization (EM) Clustering using Gaussian Mixture Models (GMM), Agglomerative Hierarchical Clustering and the like. The clusters of the set of sensor data may be generated based on various parameters such as, but not limiting to, sign value, lateral offset, sign type and the like. For example, a cluster of region start signs and/or a cluster of region end signs may be formed from the filtered sensor data.

At block 605, the system 101 may be configured to determine a validity of the road sign based on the road sign data and the transition location. The system 101 may extract at least one road sign from the one or more clusters (interchangeably used with sensor data cluster) of the filtered sensor data. Further the system 101 may determine the extracted road sign as one of the region start sign or the region end sign.

According to an example embodiment, the system 101 may access the corresponding transition location associated with the extracted road sign. The system 101 may be configured to access the map database 107 of the mapping platform 103 to access the transition location. Further the system 101 may determine that at the transition locations, there is a transition from a non-built up area link to a built up area link or vise-versa from the map data.

According to an example embodiment, the region start sign extracted from the sensor data cluster may be determined as an acceptable road sign based on determining that at the transition location there is a transition from a non-built up area link to a built up area link. Further the region start sign extracted from the sensor data cluster may be determined as an invalid road sign based on determining that at the transition location there is no transition from a non-built up area link to a built up area link. Further, the region end sign extracted from the sensor data cluster may be determined as an acceptable road sign based on determining that at the transition location there is a transition from the built up area link to the non-built up area link. Further the region end sign extracted from the sensor data cluster may be determined as the invalid road sign based on determining that at the transition location there is no transition from a built up area link to the non-built up area link.

According to an example embodiment, the system 101 classifies the transition location as the map region start location or the map region end location as explained in detail at the block 601. The classification of the map region start location and the map region end location may become inaccurate in a long course of time. For example, if there is an expansion or reduction in boundaries of the built-up area or the non-built up area, the location of the associated transition location may change. Such scenarios may lead to inaccuracy in location indicated by the map region start location and the map region end location stored in the map database 107. According to an example embodiment, the system 101 may update the map database 107 of the mapping platform 103 based on the validity of the road sign, that is to say at least one of the acceptable road sign or the invalid road sign. Thus, the system 101 may enable the map database 107 to store accurate and real-time data about the transition location, which may be one of the location of the map region start location and the map region end location. Further, according to an example embodiment, the system 101 may store the updated map data in map database 107 for future reference. Additionally or alternatively, the system 101 may provide the updated map data to the user equipment (such as the user equipment 113, 115) in real-time. In an example embodiment, the system 101 for performing the method 600 described above may comprise a processor (e.g. the processor 201a) configured to perform some or each of the operations (601-605) described above. The processor may, for example, be configured to perform the operations (601-605) by performing hardware implemented logical functions, executing stored instructions, or executing algorithms for performing each of the operations. Alternatively, the system 101 may comprise means for performing each of the operations described above. In this regard, according to an example embodiment, examples of means for performing operations (601-605) may comprise, for example, the processor 201a and/or a device or circuit for executing instructions or executing an algorithm for processing information as described above.

FIG. 7 illustrates a flow chart of another method 700 for determining the validity of a road sign in accordance with some example embodiments. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described may be embodied by computer program instructions. In this regard, the computer program instructions which embody the described procedures may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions. Also, the flowcharts described or shown herein may have a different order or may have more, fewer, or different blocks or steps.

At block 701, the method 700 may include obtaining sensor data associated with the road sign. For example, the system 101 may be configured to obtain the sensor data associated with the road sign. The sensor data may comprise road sign data corresponding to the road sign. For example, the road sign data may include but not limited to location stamp, time stamp, sign value, sign type etc. The location stamp may represent geographical coordinates of the captured road sign and the information of link on which the road sign was captured. The information of the link may comprise attributes of the links, such as, geographical coordinate of the link, number of lanes, built up area identifier, non-built up area identifier, functional class, a speed limit, a presence of a road sign, a bi-directionality, a number of lanes, a speed category, a distance to a point of interest, or a combination thereof. The time stamp may indicate the time of capture of the road sign. For example, the time may include but not limited to date, hour of the day, etc. The sign value may indicate speed restriction value imposed on the link. Further, the sign type may indicate a category of the captured road sign. For example, the category of the captured road sign may be at least one of region start sign or region end sign.

According to various embodiments, the system 101 may obtain the sensor data associated with the road sign from more than one vehicle traversing on the same link. The system 101 may obtain sensor data from the vehicle through the network 119. Further the system 101 may store the sensor data obtained from the vehicle. For example, the system 101, may store the sensor data in a memory element such as the memory 201b. Alternatively, the system 101 may process the obtained sensor data in real-time. Further, on obtaining the sensor data, the system 101 may be configured to filter the sensor data to obtain a set of filtered sensor data. The system 101 may filter the sensor data based on distance criteria as explained in detail in description of FIG. 6.

Accordingly, the road sign lying out of the distance boundary of the corresponding transition location may be removed. Further, the road signs captured on certain roads may be removed automatically from the sensor data based on a functional class associated with the road. For example, the road signs captured from a freeway road may be automatically removed from the sensor data. According to some embodiments, the road signs may be removed based on a time stamp associated with each of the road signs of the sensor data as explained in detail in description of FIG. 6.

Further, the system 101 may be further configured to generate one or more clusters of the filtered sensor data. The system 101 may be configured to utilize a clustering algorithm to generate clusters of the set of sensor data. Some non-limiting examples of clustering algorithms may be, for example, K-means clustering, mean-shift clustering, Density-Based Spatial Clustering of Applications with Noise (DBSCAN), Expectation-Maximization (EM) Clustering using Gaussian Mixture Models (GMM), Agglomerative Hierarchical Clustering and the like. The clusters of the set of sensor data may be generated based on various parameters such as, but not limiting to, sign value, lateral offset, sign type and the like. For example, a cluster of region start signs and/or a cluster of region end signs may be formed from the filtered sensor data.

At block 703, the method 700 may include determining one of a region start indicator or a region end indicator, based on the sensor data. For example, the system 101 may be configured to determine the road sign as at least one of a region start indicator or a region end indicator. According to an embodiment, the system 101 may be configured to retrieve at least one road sign from the cluster of the sensor data. Further, the system 101 may determine the road sign as at least one of the region start indicator or the region end indicator. The system 101 may be configured to access the road sign data corresponding to the road sign to determine the road sign as at least one of the region start indicator or the region end indicator. For example, the system 101 may access to sign type of the road sign from the road sign data. The sign type of the road sign may be at least one of the region start indicator or the region end indicator as labeled by the sensor associated with the vehicle. According to an embodiment, the region start indicator may correspond to region start sign posted on entrance of a region associated with built up area identifier. The region end indicator may correspond to region end sign posted on exit of a region associated with non-built up area identifier.

At block 705, the method 700 may include determining link data associated with the road sign. The system 101 may access the map data of the road sign from the map database 107 to determine the link data. The map data may comprise information of an upstream link and a downstream link associated with the road sign. Further, the map data may comprise information of a connecting location that may connect the upstream link and downstream link. Further, the system 101 may determine the connecting location as one of map region start sign and map region end sign as explained in detail in detailed description of FIG. 6.

At block 707, the method 700 may include determining a validity of the road sign. For example, the system 101 may determine the validity of the road sign based on one of the region start indicator or a region end indicator determined from the sensor data and the link data associated with the road sign, as obtained from map data. The system 101 may then determine a region end sign as a valid road sign if there was a transition from an upstream link associated with a built up area identifier to a downstream link associated with a non-built up area identifier. Further, the system 101 may determine a region start sign as a valid road sign if there was a transition from an upstream link associated with a non-built up area identifier to a downstream link associated with a built up area identifier.

According to an example embodiment, the method 700 may include determining the connecting location as one of the map region start sign and the map region end sign as explained in detail at the block 705. The determination of the map region start sign and the map region end sign may become inaccurate in a long course of time. For example, if there is an expansion or reduction in boundaries of the built-up area or the non-built up area, the location of the associated connecting location may change. Such scenarios may lead to inaccuracy in location of the map region start sign and the map region end sign stored in the map database 107. According to an example embodiment, the system 101 may update the map database 107 of the mapping platform 103 based on the determined validity of the road sign. Thus, the system 101 may enable the map database 107 to store accurate and real-time location of the map region start sign and the map region end sign. Further, according to an example embodiment, the system 101 may provide the updated map data to the user equipment (such as the user equipment 113, 115) in real-time. Additionally or alternatively, the system 101 may store the updated map data in map database 107 for future reference.

In an example embodiment, the system 101 for performing the method 700 described above may comprise a processor (e.g. the processor 201*a*) configured to perform some or each of the operations (701-707) described above. The processor may, for example, be configured to perform the operations (701-707) by performing hardware implemented logical functions, executing stored instructions, or executing algorithms for performing each of the operations. Alternatively, the system 101 may comprise means for performing each of the operations described above. In this regard, according to an example embodiment, examples of means for performing operations (701-707) may comprise, for example, the processor 201*a* and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. The focus is on road signs, but the methods and applications discussed herein can also apply to other road objects. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for validating a road sign, comprising:
at least one non-transitory memory configured to store computer program code instructions; and
at least one processor configured to execute the computer program code instructions to:
determine a transition location associated with the road sign using map data, wherein the transition location is at least one of a map region start location or a map region end location;
determine road sign data associated with the road sign using a sensor data cluster; and
determine a validity of the road sign based on the road sign data and the transition location, wherein the map data is used to determine if, at the transition location, there is a transition from a non-built up area link to a built up area link or from a built up area link to a non-built up area link.

2. The system of claim 1, wherein the road sign data comprises a road sign type, wherein the road sign type comprises one of a region start sign or a region end sign.

3. The system of claim 2, wherein to determine the validity of the road sign, the at least one processor is further configured to:
determine if the road sign type is region start sign from sensor data cluster; and
determine the validity of the road sign as an acceptable road sign if it is determined that at the transition location there is a transition from a non-built up area link to a built up area link.

4. The system of claim 2, wherein to determine the validity of the road sign, the at least one processor is further configured to:
determine if the road sign type is region start sign from sensor data cluster; and
reject the road sign as an invalid road sign if it is determined that at the transition location there is not a transition from a non-built up area link to a built up area link.

5. The system of claim 2, wherein to determine the validity of the road sign, the at least one processor is further configured to:
determine if the road sign type is region end sign from sensor data cluster; and
validate the road sign as an acceptable road sign if it is determined that at the transition location there is a transition from a built up area link to a non-built up area link.

6. The system of claim 2, wherein to determine the validity of the road sign, the at least one processor is further configured to:
determine if the road sign type is region end sign from sensor data cluster; and
reject the road sign as an invalid road sign if it is determined that at the transition location there is not a transition from a built up area link to a non-built up area link.

7. The system of claim 1, wherein to determine the transition location associated with the road sign using map data, the at least one processor is further configured to:
determine at least one upstream link and at least one downstream link associated with a connecting location of the map data; and
determine if the connecting location is the transition location based on a comparison of the at least one upstream link with a built up area link and a non-built up area link and the at least one downstream link with the built up area link and the non-built up area link.

8. The system of claim 7, wherein to determine the transition location associated with the road sign using map data, the at least one processor is further configured to classify the transition location as the map region start location if the at least one upstream link is the non-built up area link and the at least one downstream link is the built up area link.

9. The system of claim 1, wherein the at least one processor is further configured to update the map data based on the validity of the road sign.

10. The system of claim 9, wherein to update the map data, the at least one processor is further configured to update the transition location.

11. The system of claim 1, wherein the sensor data cluster comprises a cluster of road sign observations based on a predefined distance criteria, wherein the predefined distance criteria comprises a configurable distance threshold, wherein the configurable distance threshold comprises a numerical value specifying a distance of separation between a road sign location and the transition location.

12. A method for validating a road sign, the method comprising:
determining a transition location associated with the road sign using map data, wherein the transition location is at least one of a map region start location or a map region end location;
determining road sign data associated with the road sign using a sensor data cluster; and
determining, by at least one processor, a validity of the road sign based on the road sign data and the transition location, wherein the map data is used to determine if, at the transition location, there is a transition from a non-built up area link to a built up area link or from a built up area link to a non-built up area link.

13. The method of claim 12, wherein the road sign data comprises a road sign type, wherein the road sign type comprises one of a region start sign or a region end sign.

14. The method of claim 13, wherein validating the road sign further comprises:
determining if the road sign type is region start sign from sensor data cluster; and
validating the road sign as an acceptable road sign if it is determined that at the transition location there is a transition from a non-built up area link to a built up area link.

15. The method of claim 13, wherein validating the road sign further comprises:
determining if the road sign type is region start sign from sensor data cluster; and
rejecting the road sign as an invalid road sign if it is determined that at the transition location there is not a transition from a non-built up area link to a built up area link.

16. The method of claim 12, wherein determining the transition data associated with the road sign further comprises:
determining at least one upstream link and at least one downstream link associated with a connecting location of the map data; and
determining if the connecting location is the transition location associated with the transition data based on a comparison of the at least one upstream link with a built up area link and a non-built up area link and the at least one downstream link with the built up area link and the non-built up area link.

17. The method of claim 16, wherein determining the transition location associated with the road sign further comprises classifying the transition location as the map region end location if the at least one upstream link is the built up area link and the at least one downstream link is the non-built up area link.

18. The method of claim 12, further comprising updating the map data based on the validity of the road sign.

19. The method of claim 18, wherein updating the map data further comprises updating the transition location.

20. A method for validating a road sign associated with a map region, comprising:
   obtaining sensor data associated with the road sign;
   determining one of a region start indicator or a region end indicator, based on the sensor data;
   determining link data associated with the road sign, wherein the link data specifies a transition from a non-built up area link to a built up area link or from a built up area link to a non-built up area link; and
   determining a validity of the road sign, based on the one of the region start indicator or a region end indicator and the link data associated with the road sign.

* * * * *